US006572290B2

(12) United States Patent
McCleave et al.

(10) Patent No.: US 6,572,290 B2
(45) Date of Patent: Jun. 3, 2003

(54) TAPE PRINTER

(75) Inventors: Chris McCleave, London (GB); Michel Woodman, Huntingdon (GB)

(73) Assignee: Esselte N.V., Sint-Niklaas (BE)

( * ) Notice: Subject to any disclaimer, the term of this patent is extended or adjusted under 35 U.S.C. 154(b) by 0 days.

(21) Appl. No.: 10/151,160

(22) Filed: May 21, 2002

(65) Prior Publication Data

US 2002/0136584 A1 Sep. 26, 2002

Related U.S. Application Data

(63) Continuation of application No. 09/625,863, filed on Jul. 26, 2000, now abandoned.

(30) Foreign Application Priority Data

Aug. 2, 1999 (GB) ............................................ 9918163

(51) Int. Cl.[7] .......................... B41J 11/26; B41J 29/02; B32B 31/00; B65H 20/00

(52) U.S. Cl. ......................... 400/621; 400/88; 400/613; 400/615.2; 400/693; 156/384; 226/128; 82/100

(58) Field of Search .......................... 400/693, 88, 613, 400/621, 615.2; 156/384, 387; 82/100; 226/120

(56) References Cited

U.S. PATENT DOCUMENTS

| | | | | |
|---|---|---|---|---|
| 4,407,692 A | | 10/1983 | Torbeck | 156/350 |
| 5,344,248 A | | 9/1994 | Schoon et al. | 400/693 |
| 5,364,196 A | | 11/1994 | Baitz et al. | 400/691 |
| 5,374,132 A | | 12/1994 | Kimura | 400/586 |
| 5,556,213 A | | 9/1996 | Kudo et al. | 400/621 |
| 5,629,832 A | | 5/1997 | Sellers | 361/680 |
| 5,704,722 A | | 1/1998 | Kanou | 400/61 |
| 5,758,039 A | | 5/1998 | Shibata et al. | 395/110 |
| 5,826,995 A | | 10/1998 | Day et al. | 400/615.2 |
| 5,829,897 A | | 11/1998 | Murai | 400/615.2 |
| 5,913,624 A | | 6/1999 | Ikegami | 400/621 |
| 6,206,593 B1 | | 3/2001 | Brenner et al. | 400/693 |
| 2002/0070258 A1 | * | 6/2002 | LeMoine et al. | |

FOREIGN PATENT DOCUMENTS

| | | |
|---|---|---|
| EP | 0 711 637 | 5/1996 |
| EP | 0 832 753 | 4/1998 |
| EP | 0 894 635 | 2/1999 |
| GB | 2 175 276 | 11/1986 |

* cited by examiner

*Primary Examiner*—Andrew H. Hirshfeld
*Assistant Examiner*—Marvin P. Crenshaw
(74) *Attorney, Agent, or Firm*—Pennie & Edmonds LLP

(57) ABSTRACT

A tape printer comprising a tape receiving portion for receiving a supply of tape on which an image is to be printed; printing means for printing an image on said tape; cutting means for cutting at least partially said tape; and a cutter operation arrangement for manually operating said cutting means, said cutter operation arrangement comprising a first operating portion and a second operating portion, at least one of said first and second operating portions being movable toward the other, said operating portions being such that in use a user contacts both of said portions in order to move the at least one moveable portion towards the other.

22 Claims, 7 Drawing Sheets

TAPE PRINTER

RELATED APPLICATIONS

This is a continuation of U.S. application Ser. No. 09/625,863 filed Jul. 26, 2000 now abandoned.

FIELD OF THE INVENTION

The present invention relates to a tape printer.

BACKGROUND OF THE INVENTION

Tape printers are known which use a supply of tape, housed in a cassette received in the tape printer. The tape comprises an image receiving layer and a backing layer which are secured to one another via an adhesive layer. After an image has been printed onto the image receiving layer, the backing layer can be removed allowing the image receiving layer to be secured to an object using the adhesive layer. Such tape printers include a cutting mechanism for cutting off a portion of the tape after an image has been printed onto the image receiving layer so that the portion of tape can be used as a label. For this purpose the cutting mechanism includes a blade which is intended to cut through all the layers of the tape. In some tape printers, the cutting mechanism also includes a so-called tab cut blade which is intended to cut only through one of the layers of the tape, the image receiving layer or the backing layer, leaving the other layer intact. Such a tab cut allows easy separation of the image receiving layer from the backing layer.

The cutting mechanism in these known tape printers can be operated by the user manually or via a driving mechanism. Where the cutting mechanism is to be manually operated by the user, a relatively large force needs to be applied in order to perform the cutting operation. Usually, the tape printer will be provided with a lever which is operated by the user. However, these manually operated mechanisms do have the problem that the application of force to operate the lever can cause the tape printer body to move. This may result in the tape printer flipping onto one of its sides or even falling off a surface. Accordingly, users tend to compensate for this by using one hand to operate the lever and another hand to stabilise the tape printer during the operation of the lever. This can be disadvantageous.

The Meto 5000 is a bar code printer that was produced by Esselte Meto which prints bar codes on die cut labels. This printer has a keyboard which is hingedly connected to a main body. The main body includes a printer and also houses a supply of labels on which the bar code is printed. As the labels are die cut labels, this printer does not have a cutter.

SUMMARY OF THE INVENTION

It is an aim of some embodiments of the present invention to address this problem.

According to one aspect of the present invention, there is provided a tape printer comprising a tape receiving portion for receiving a supply of tape on which an image is to be printed; printing means for printing an image on said tape; cutting means for cutting at least partially said tape; and a cutter operation arrangement for manually operating said cutting means, said cutter operation arrangement comprising a first operating portion and a second operating portion, at least one of said first and second operating portions being movable toward the other, said operating portions being such that in use a user contacts both of said portions in order to move the at least one moveable portion towards the other.

Accordingly, in preferred embodiments of the present invention, the user will grip or contact with his hand both of the operating portions and urge one portion towards the other. This operation may be performed with one hand. A cutting operation may occur when the operating portions are moved one towards the other.

In preferred embodiments of the present invention, one of the first and second operating portions is movable and the other of said operating portions is stationary. In alternative embodiments of the present invention both of the operating portions may be movable.

Preferably, the first and second operating portions project from the tape printer. The first and second portions preferably project from the side of the tape printer opposite to the side on which the tape printer is supported. In alternative embodiments of the present invention, one projecting portion may be provided whilst the other portion comprises a surface of the housing.

Preferably, the first and second operating portions each have a contact surface which contacts the contact surface of the other operating portion when at least one portion is moved towards the other, the surfaces being shaped to fit together. One of the surfaces may be convex and the other of the surfaces may be concave. Alternatively, both of the surfaces may be planar.

Preferably, a guide is provided for guiding the movement of the at least one portion. The guide may be in the form of a slot which substantially extends between the first and second operating portions.

According to a second aspect of the present invention, there is provided a tape printer comprising a main body having a tape receiving bay for receiving a supply of tape on which an image is to be printed, printing means for printing an image on said tape, cutting means for separating a portion of the tape on which said image is printed from the supply of tape received in tape receiving bay; and a keyboard, said keyboard being hingedly connected to the main body, said keyboard having an open position and a closed position, said keyboard being against the main body in the closed position.

As the keyboard can be folded against the tape printer, embodiments of the invention may achieve a tape printer which has a relatively large size, when in use, but can also be stored in a compact manner.

The main body may comprise a display. The main body may comprises a main surface comprising the display and via which access to the tape receiving bay may be obtained. The main surface may be perpendicular to a support surface on which the tape printer is supported in use. In this way, the display may be in a substantially vertical plane with respect to the support surface which may make it easier for the user to view the display.

The main body may further comprise a door portion, the door portion covering the tape receiving bay and when the keyboard is in the closed position be between the keyboard and the main body. The door portion preferably does not cover the display. The main body may comprise a battery receiving bay, with the battery receiving bay also being covered by said door. Preferably, the door comprises a window over at least part of the tape receiving bay whereby the amount of tape contained in the tape receiving bay can be viewed by the user. Additionally, or alternatively, the user can use the window to determine the type of cassette. The whole of the door may alternatively be transparent.

The tape receiving bay may be shaped to receive a cassette of tape. Incorporated in the tape receiving bay may be the printing means.

It should be appreciated that the first and second aspects may be used in conjunction with one another in certain embodiments of the present invention.

BRIEF DESCRIPTION OF THE DRAWINGS

For a better understanding of the present invention and to show how the same may be carried into effect reference will now be made by way of example to the accompanying drawings in which.

DETAILED DESCRIPTION OF EMBODIMENTS OF THE INVENTION

Reference will now be made to FIGS. 1 to 6 which show various views of a tape printer 2. The tape printer 2 comprises a keyboard 4. The keyboard 4 has a plurality of data entry keys which allow data to be input and edited. This input data can then be printed onto a tape to define a label.

The tape printer 2 also has a liquid crystal display 18 which displays the data as it is entered. The display 18 allows the user to view all or part of the label to be printed which facilitates in the editing of the label prior to its printing. Additionally, the display 18 can also display messages to the user, for example, error messages or an indication that a print key should be actuated.

Figure 1:
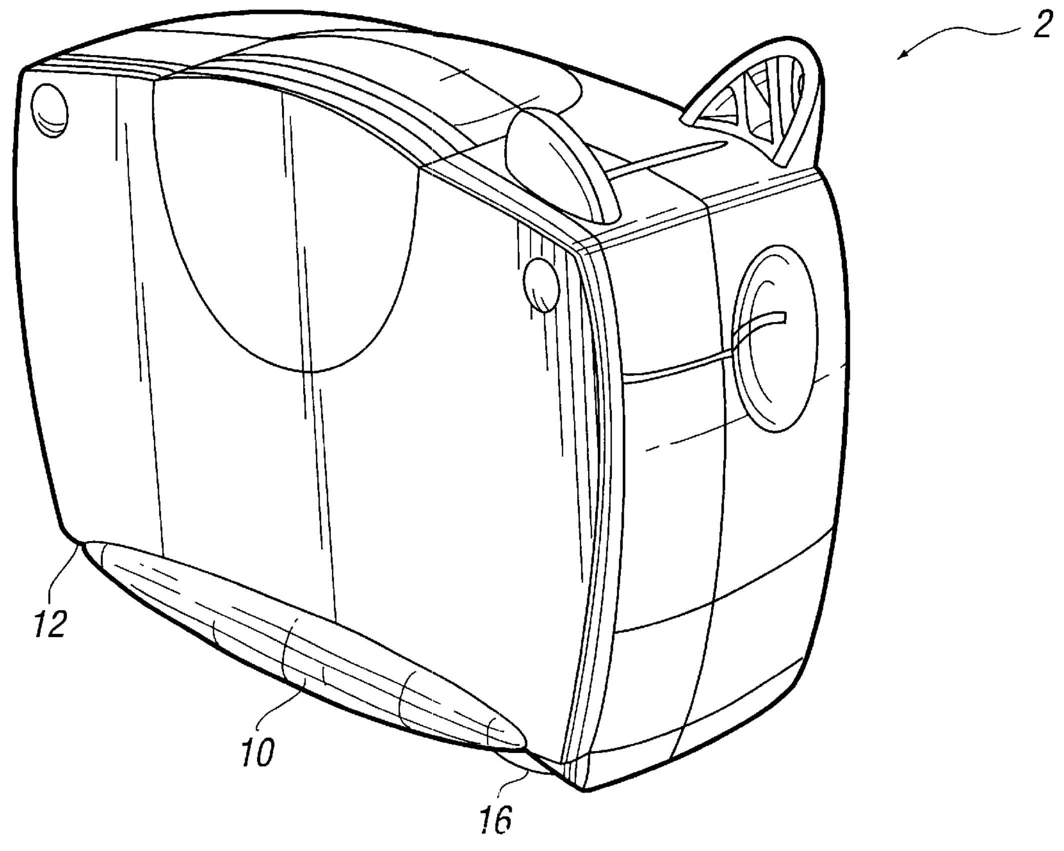
FIG. 1 is a front perspective view of a tape printer embodying the present invention, when in its closed configuration.
Figure 2:
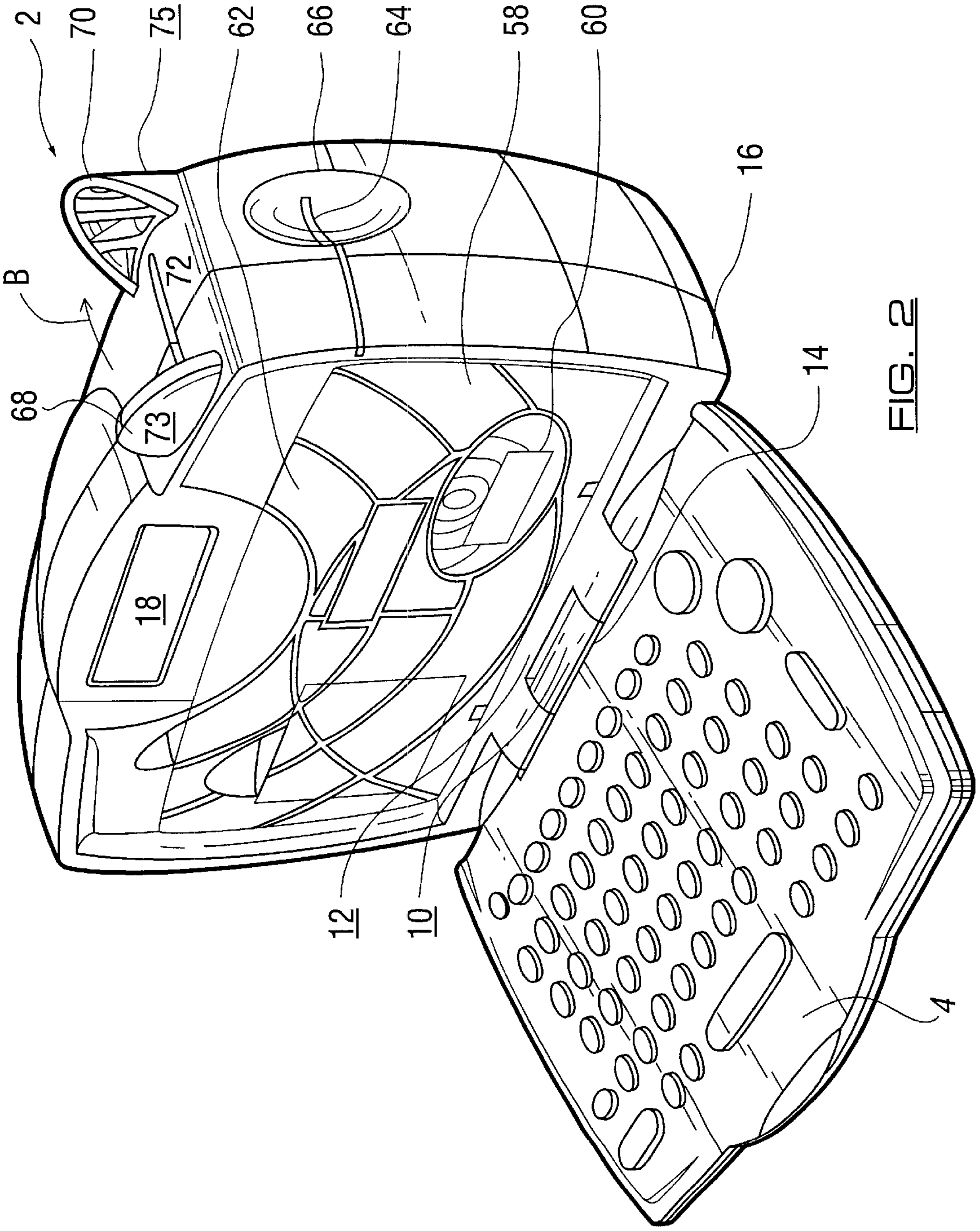
FIG. 2 is a front perspective view of the tape printer of FIG. 1, when in its open configuration.
Figure 3:
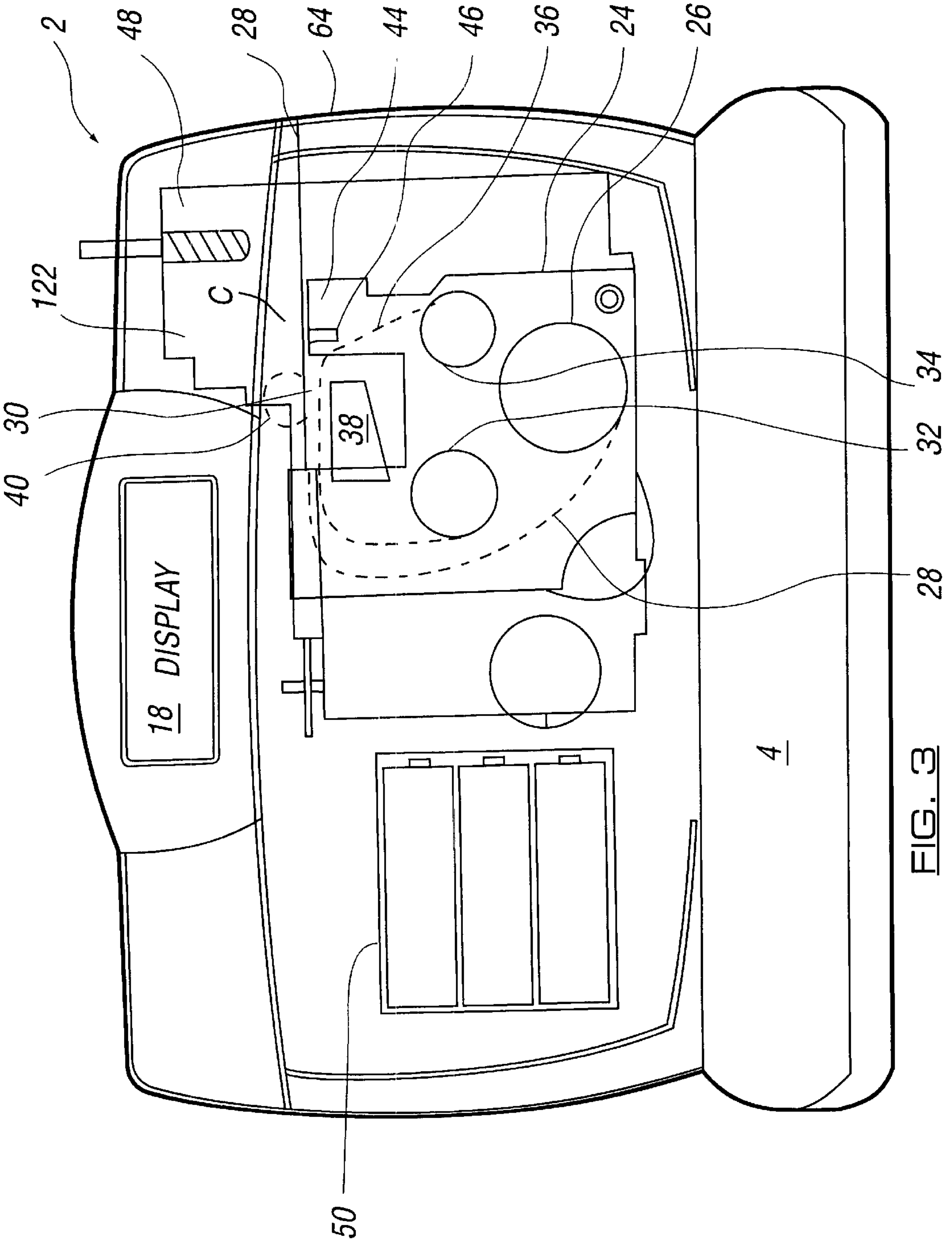
FIG. 3 shows the same view as FIG. 2 with part of the cover removed for clarity.
Figure 4:
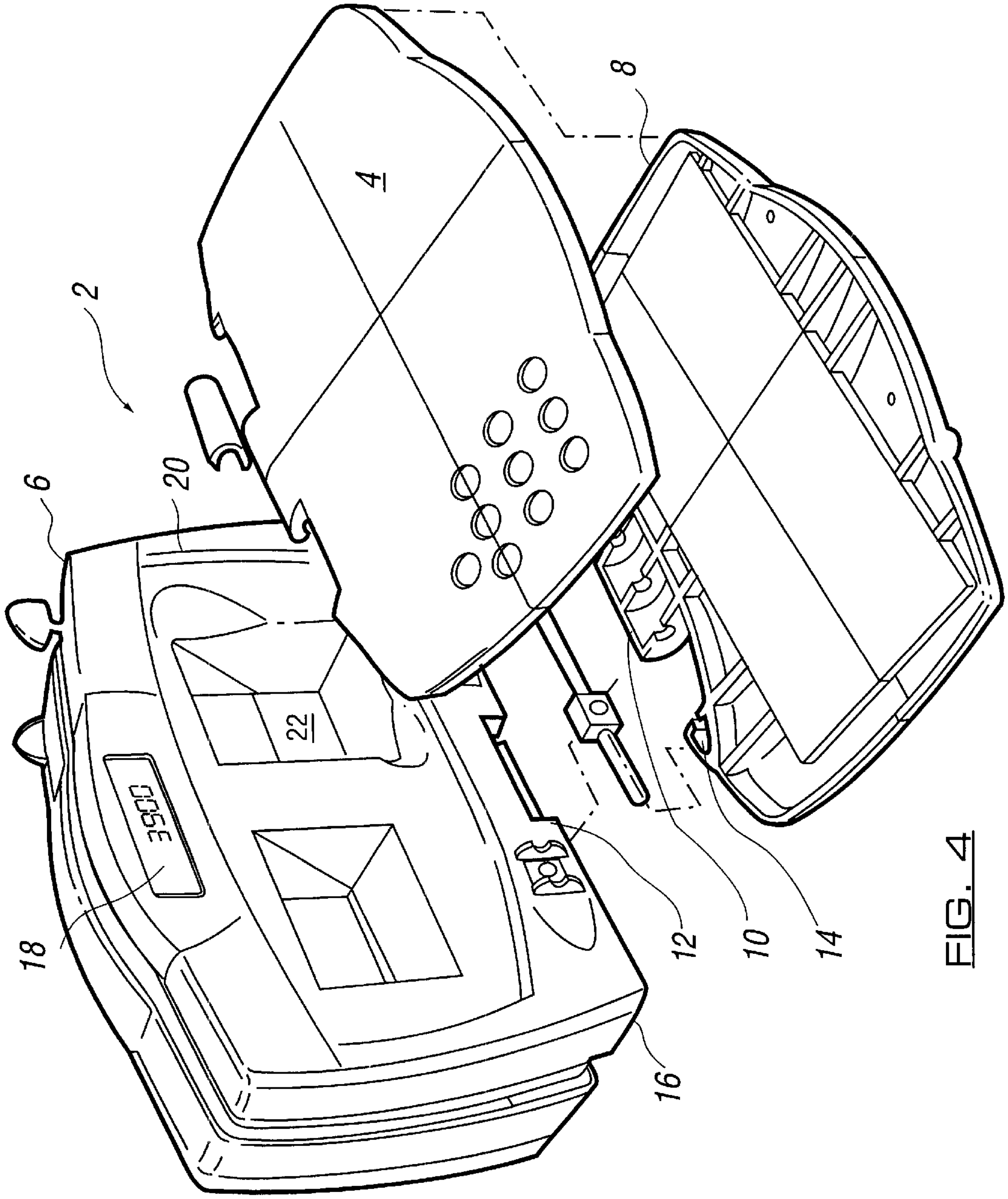
FIG. 4 shows an exploded view of the tape printer of FIG. 1.
Figure 5:
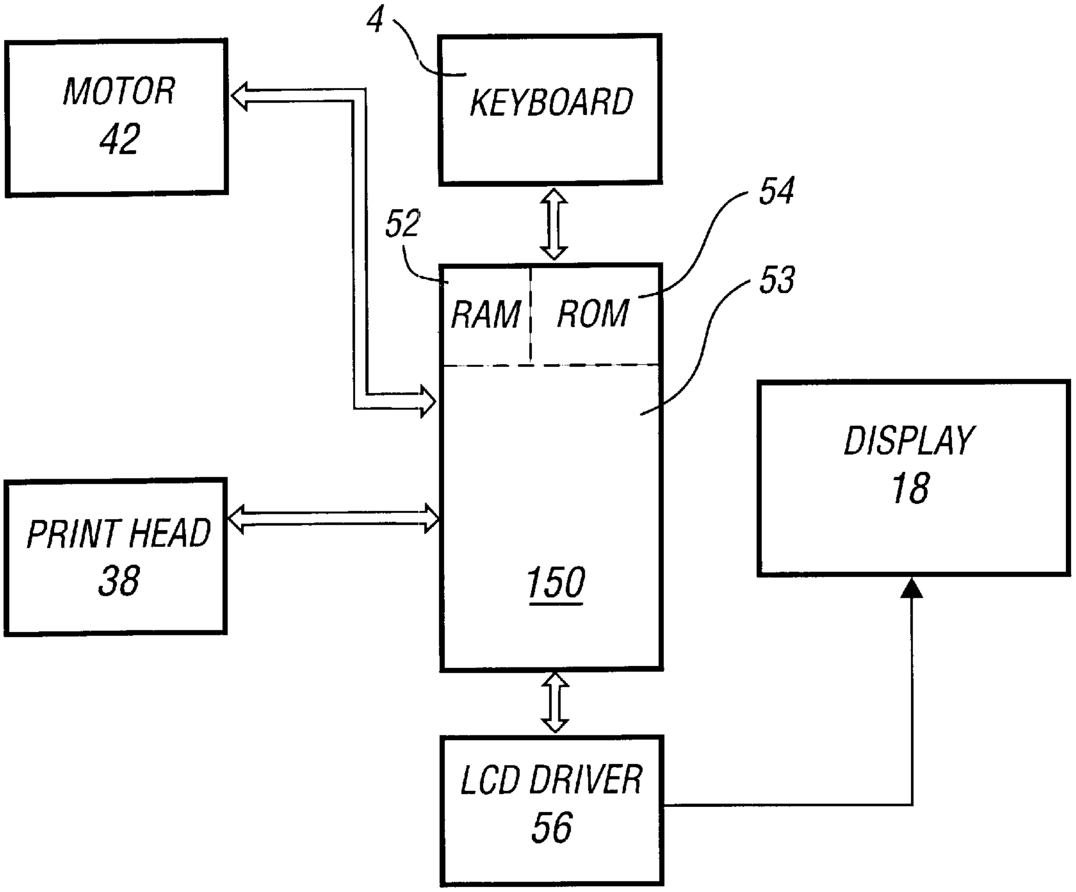
FIG. 5 is a simplified block diagram of control circuitry for controlling the tape printing apparatus of FIG. 1.

As can be seen from the Figures, the tape printer 2 comprises a main body 6 and a lid portion 8. The lid portion 8 accommodates the keyboard 4. The lid portion 8 and the main body 6 are connected to each other via a hinge 10 which extends along a side 12 and 14 respectively of the main body 8 and lid portion 8. As can be seen from the Figures, the sides 12 and 14 which are connected together via the hinge 10 are adjacent the undersurface 16 of the main body 6 on which the.tape printer rests. The lid portion 8 is moveable between a position in which the keyboard rests on the surface on which the base of the base 16 of the tape printer 2 rests (for example as shown in FIGS. 2 and 3) and a second position in which the lid portion 18 is in a closed position (for example as shown in FIG. 1). When in the closed position, the lid portion 8 covers one side 20 of the tape printer 2 and is perpendicular to the surface on which the tape printer 2 is resting.

The lid portion 8 is hinged to the main body 6 in such a manner that when the lid portion 8 is in a position between its open and closed positions, it will be urged into one or other of those positions by a spring mechanism incorporated in its hinge. However, this feature may be omitted. In alternative embodiments the lid portion will remain where left in any position between almost closed and fully opened by means of a friction spring located inside the hinge mechanism. A catch (not shown) or any other suitable arrangement is provided to retain the lid portion in the closed portion, when required.

The main body 6 has a tape receiving bay 22 for accommodating a cassette 24. The cassette 24 is arranged to accommodate a supply spool 26 of image receiving tape 28. The image receiving tape 28 comprises an upper layer for receiving a printed image on one of its surface and has its other surface coated with an adhesive layer to which is secured a releasable backing layer. The image receiving tape 28 is guided by a guide mechanism (not shown) through the cassette 24, out of the cassette 24 through an outlet O, past a print zone 30 to a cutting location C. The same cassette 24 also has an ink ribbon supply spool 32 and ink ribbon take-up spool 34. The image receiving tape 28 and the ink ribbon 36 are arranged to pass in overlap to the print zone 30. The image receiving layer of the image receiving tape 28 will be in contact with the ink ribbon 36.

Also accommodated in the cassette receiving bay 22 is a thermal printhead 38 and a platen 40. The thermal printhead 38 and the platen 40 cooperate to define the print zone 30. The printhead is pivotable so that it can be bought into contact with the platen 40 for printing and moved away from the platen 40 to enable a cassette to be removed and replaced.

The platen 40 is driven by a motor 42 (see FIG. 5), for example a DC motor or a stepper motor so that it rotates to drive the image receiving tape 28 in a direction which is parallel to the lengthwise extent of the image receiving tape 28 through the print zone 30. In this way, an image is printed on the image receiving tape 28 and the image receiving tape is fed from the print zone 30 to the cutting location C provided at a location on a portion of the wall of the cassette 24 which is close to the print zone 30. The portion of the wall of the cassette 24 where the cutting location C is defined is denoted by reference 44. A slot 46 is defined in the wall portion 44 and the image receiving tape 28 is fed past the print zone 30 to the cutting location C where it is supported by facing wall portions on either of the slot 64. The cutting mechanism 48 will be described in more detail hereinafter.

The main body 6 also has a bay 50 which accommodates a supply of batteries. The tape printer 2 may alternatively or additionally be powered via a mains supply.

The main body 6 accommodates the motor 42 as well as the control circuitry. The control circuitry comprises a microprocessor chip 150 having a read only memory 54, a microprocessor 53 and a random access memory 52. The microprocessor 53 is controlled by programming stored in the ROM 54 and when so controlled acts as a controller. The microprocessor chip 150 is connected to receive label data input to it from the keyboard 4. The microprocessor chip 150 outputs data to drive the display 18 via a display driver chip 56 to display a label to be printed (or a part thereof) and/or messages or instructions for the user. The display driver chip 56 may form part of the microprocessor chip 150. The microprocessor chip 150 also outputs data to drive the printhead 38 which prints an image onto the image receiving tape 28 to form a label. The data output to the printhead 38 defines which printing elements of the printhead are to be activated. Finally, the microprocessor chip 150 also controls the motor 42 for driving the image receiving tape 28 through the tape printing apparatus 2.

In preferred embodiments of the present invention, the printhead 38 is a thermal printhead which has a height sufficient to print on the widest width of tape used with the tape printer. The printhead may be one pixel or printing element wide. The printhead may print directly on thermally sensitive tape thus avoiding the need for ink ribbon.

The openings of the battery bay 50 and the cassette receiving bay 22 are covered by a second lid 58. This lid 58 is hingedly connected to the main body 6 of the tape printer 2. The lid is dimensioned so that it covers most of the surface 20 of the main body 6 which contains the battery and cassette receiving bay but not the display 18. The cassette bay and battery bay are covered by this one lid. It should be appreciated that in alternative embodiments of the invention, separate lids may be provided for the cassette bay and the battery bay. The lid 58 has a window 60 which allows the user to see how much tape is left on the supply spool 26. The user may also be able to view the type of tape or a label. The characteristics which can be determined via the window comprise tape size, printing colour and background colour. In preferred embodiments of the invention, this information is provided on the label on the cassette which can be viewed through the window. The remainder of the lid is preferably opaque. However, it should be appreciated that all of the lid may be transparent, or all of the lid may be opaque. The second lid may alternatively be translucent. A clip 62 is provided for retaining the second lid 58 in place over the cassette receiving bay 22 and the battery bay 50. The lid 58 is moved when the cassette or the batteries need to be changed.

As can be seen from FIG. 2, the tape exits the printer 2 via slot 64. An oval recess 66 is provided in the housing, the slot 64 extending at least partially across the slot. This recess 66 is provided to decrease the distance between the cutting location and the outlet of the tape printer. This means that the length of the margins at the beginning and/or end of the label can be minimised where the amount of text on the label is small. This is because the label needs to have a length greater than the distance between the cutting location and the exit from the tape printer so that the cut label can be removed by the use without the risk of a tape jam.

The cutting mechanism will now be described. The cutting mechanism has a lever 68 which is moved by the user towards cooperating projection 70 in the direction of arrow B. This lever 68 and projection 70 are located on the top surface 76 of the tape printer 2. This top surface is the opposite surface to that on which the tape printer is supported. A slot 72 is provided in the external casing which allows the lever 68 to be moved towards and away from the projection 70. The lever 68 is spring loaded or the like so to return to the position shown in, for example, FIG. 2 where it is spaced apart from the projecting portion 70. Alternatively, the lever may be moved backed to its starting position by the user. The lever 68 is designed so as to be moved by the thumb of a user towards the protecting portion. The index finger of the same hand of the user can curl round or just contact the projecting portion 70. Movement of the lever towards the projection causes a cutting operation to be performed.

The lever 68 has a convex surface on the side facing the projection portion 70 whilst the projecting portion 70 has a concave surface on the side facing the lever 68. Accordingly, when the lever 68 is pressed against the projecting portion 70, the concave part of the projecting portion 70 receives the convex part of the lever 68.

It should be appreciated that the lever could have the concave surface with the projecting portion having the convex surface. The projecting portion and lever may both have planar surfaces or any other suitable shapes.

Parts 73 and 75 of the lever 68 and the projecting portion 70 respectively may be shaped to facilitate contact with the users hand. For example the part 70 of the lever may be concave or convex as may part 75 of the projecting portion. Finger indentation portions may be provided.

The projecting portion may be replaced by a surface on the tape body which may be shaped to facilitate contact with the users hand.

The projection portion or surface and the lever are spaced apart in preferred embodiments of the user by a distance which is no greater than the typical distance between the thumb and first finger of the hand of a user.

Figure 6:
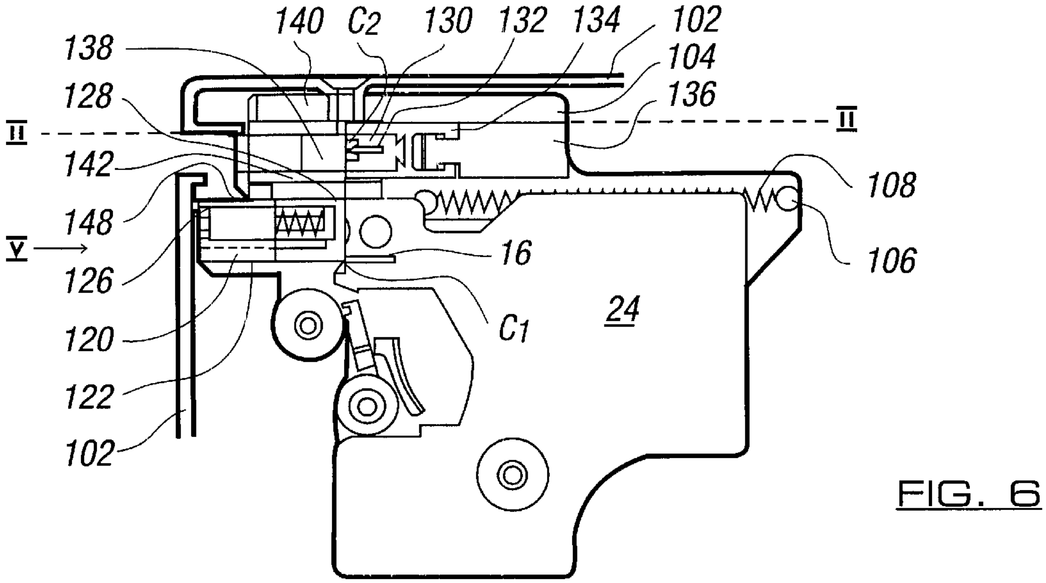
FIG. 6 is a plan view of a cutting mechanism in a printing device with a cassette present.

FIG. 6 is a plan view of a cutting mechanism in accordance with one embodiment of the present invention shown in a printing apparatus having a printing mechanism and in which a cassette is located. Reference numeral 102 designates a casing of the printing apparatus within which is located a base plate 104 which includes an upstanding part 106 used for mounting a return spring 108.

The cutting mechanism has two main components. The first component comprises a cutter body 120 on which is mounted a blade 122. The blade is intended to cut through the full thickness of the tape T into the slot 46 provided within the cassette 24 at a first cutting location C1. The cutter body 120 moves on supports 156, 158. The cutter body 120 includes at its surface adjacent the tape a tape clamp 128 for holding the tape against a supporting surface of the cassette during cutting. Reference numeral 126 denotes a tape clamping spring of which there are two, one associated with each support 156, 158. Operation of this part of the cutting mechanism is disclosed in our European Patent Application No 94304284.6 the contents of which are herein incorporated by reference.

The second part of the cutting mechanism provides a so-called tab cut through the tape at a second cutting location $C_2$spaced from the fixed cutting location. The tape is a multilayer tape including at least an upper layer, an adhesive layer and a backing layer which can be removed from the adhesive layer so that the upper layer may be secured to an object using the adhesive layer. An image or message is printed on the upper layer of the tape. In FIG. 6, the upper layer of the tape is to the right of the figure, adjacent the printhead. The second part of the cutting mechanism includes a blade holder 130 which holds a so-called tab cut blade 132. The tab cut blade holder 130 is mounted in a tab cut sprung body 134 which itself is sprung against a tab cut support part 136 of the printer. This part of the cutting mechanism also includes a so-called rolling anvil 138. The rolling anvil 138 is rolled down against the tab cut blade 132 causing a cut to be made progressively across the width of the tape. The depth of cut is controlled so that the cut is made only through the upper layer of the tape, leaving the backing layer intact, to generate a so-called tab cut.

Figure 7:
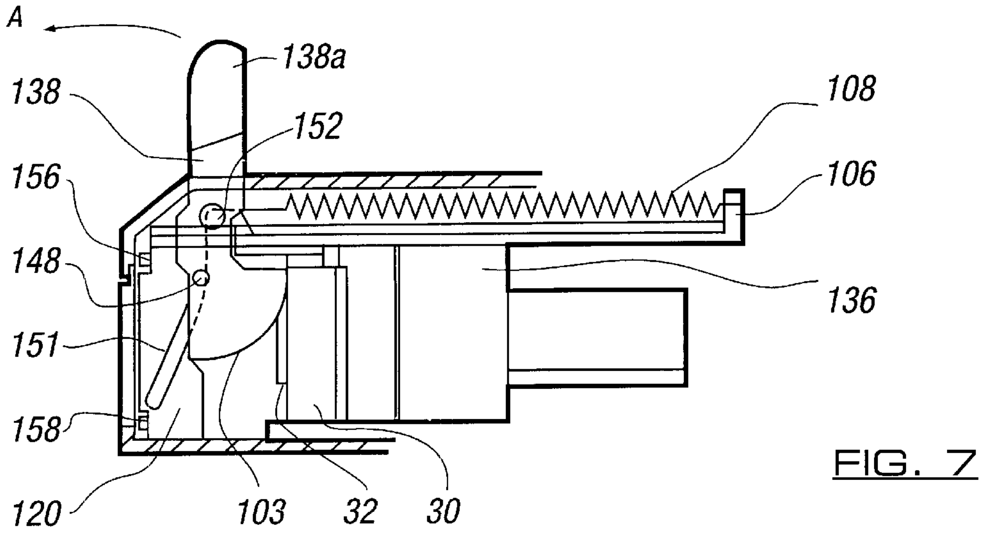
FIG. 7 is a section taken along lines II—II of FIG. 6, showing the rolling anvil in a start position.
Figure 9:
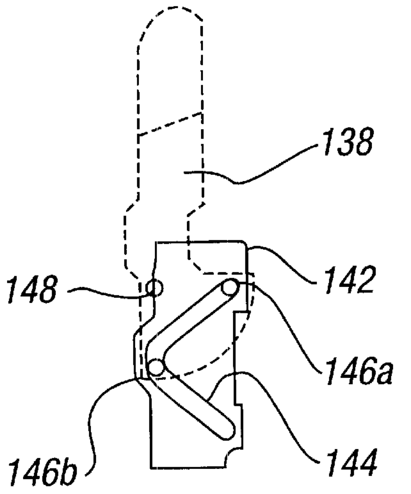
FIG. 9 is a diagram illustrating the guide mechanism for the anvil.

The rolling anvil 138 can be seen more clearly in FIG. 7 which is a view taken along line II—II in FIG. 1. It has an arcuate anvil surface 3 and an actuating part 138*a*. FIGS. 6 and 7 show the rolling anvil in the start position. The rolling anvil 138 has its motion controlled by two guides, a first guide 140 located towards the casing 2 of the print and a second guide 142 located inwardly towards the cassette receiving bay. The guides 140, 142 include guide tracks for controlling the motion of the rolling anvil 138 as shown more clearly in FIG. 9 which is a view of the guide member 142 taken from the side closest to the anvil and with the rolling anvil shown in a broken line. Reference numeral 144 denotes the guide track for the anvil. To allow it to be guided, the anvil has two protrusions, for example in the form of balls or pins 146*a*, 146*b* located respectively towards the ends of its arcuate anvil surface 3. The pins 146*a*, 146*b* cannot be seen in FIG. 7 because they are on the side of the rolling anvil away from the viewer. The equivalent pins located on the side of the anvil facing the viewer for cooperation in similar guide tracks in the guide 140 have been omitted from FIG. 7 for the sake of clarity. It will be appreciated that it may not be necessary in all circumstances to positively guide the anvil from both sides. Guiding by one guide only at one side may be sufficient. The rolling anvil also carries a cutter body actuation pin 148. Location of this pin is shown in FIG. 9, and is on the side of the anvil 138 away from the view in FIG. 7. The cutter body 120 includes a track 151 shown in FIG. 7 in which the pin 148 on the anvil 138 runs. The track 151 extends at an angle as shown in FIG. 7.

Figure 8:
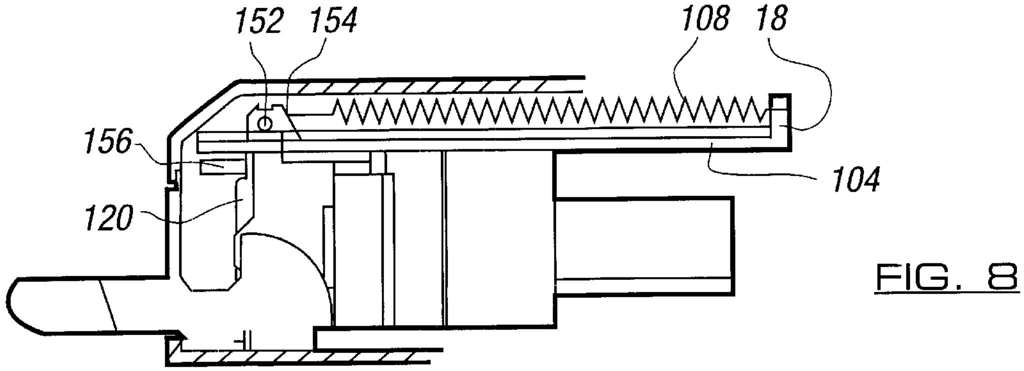
FIG. 8 is a view similar to that of FIG. 7 showing the anvil in a finish position.

Referring now to FIG. 8, the base plate 104 includes at an end of the return spring 108 opposed to the end attached to the upstanding part 106 a pulley member 152 held in a locating part 154 of the base plate. The return spring 108 is drawn over the pulley 152 onto the cutter body actuation pin 148 of the anvil 138 as shown in FIG. 7.

Figure 10:
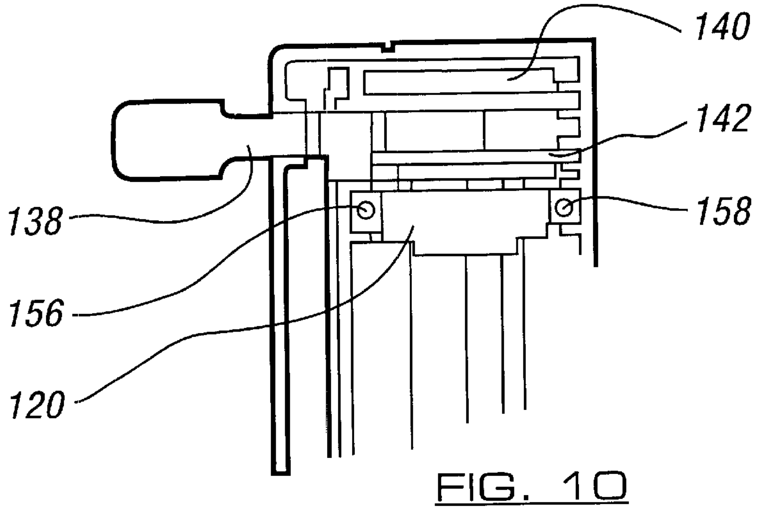
FIG. 10 is an end view taken in the direction of arrow V in FIG. 6.

FIG. 10 is a view taken in the direction of arrow V in FIG. 6. In FIG. 10 can be seen the rolling anvil 138 together with its guides 40,42. FIG. 10 also illustrates the cutter body 120. As can be seen most clearly in FIGS. 8 and 10, the cutter body 120 moves on supports 156, 158.

Operation of the cutting mechanism will now be described with particular reference to FIGS. 7 to 9. FIG. 7 illustrates the start position. In this position, the return spring 108 which extends between the upstanding part 106, round the pulley member 152 to the cutter body actuation pin 148 is in a relaxed state. The guide pins 146*a*, 146*b* are lcoated in an upper portion of the guide track 144. The cutter body 120 is in a position holding the blade 122 spaced from the tape 118. To make a cut, the actuation part 138*a* of the rolling anvil 138 is moved in the direction of arrow A in FIG. 7. Motion of the anvil is controlled by movement of the guide pins 146*a*, 146*b* in the guide track 144. As will be described more fully hereinafter, movement is controlled in a manner which ensures that the arcuate anvil surface rolls along the surface of the tab cut blade holder 130 progressively tab cutting the tape as it goes at the second cutting location $C_2$. The guide pins and guide track are located to ensure that the motion is an accurate, repeatable rolling motion.

As the rolling anvil 138 moves, the cutter body actuation pin 148 is caused to move along the track 151 in the cutter body 120. This causes the cutter body 120 to be moved to the right in FIG. 7. Movement of the cutter body actuation pin 148 downwardly also causes the return spring 108 to be extended and placed in a tensioned state. As the cutter body 120 moves to the right in FIG. 7, the blade 122 supported by the cutter body 120 performs a full cut through the tape at the cutting location C1.

FIG. 8 shows the cutting mechanism in its finish state. The cutter body 120 is fully to the right with the blade 122 received in the slot 124 and the rolling anvil 138 has reached the end of its motion. The effect of this has been to make a full cut through the tape at the first cutting location C1 and to make a tab cut through the upper layer of the tape only by the action of the tab cut blade 132 against the arcuate anvil surface of the rolling anvil 138 at the second cutting location $C_2$. Once the actuation part 138*a* of the rolling anvil 138 is released, tension in the return spring 108 causes the rolling anvil 138 to return to its start position and this simultaneously causes the cutter body 120 to return to its start position.

Figures 11A, 11B, 11C:
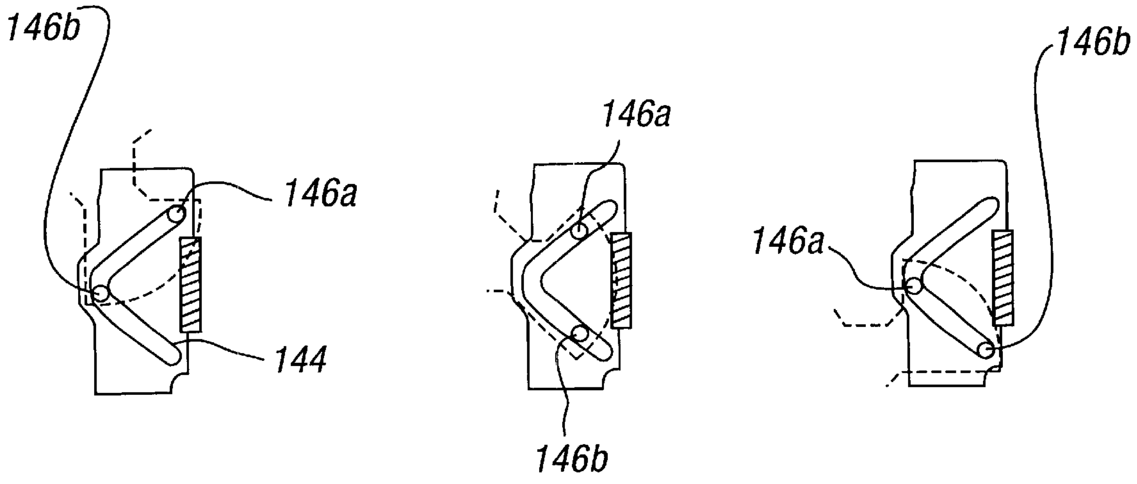
FIGS. 11*a* to 11*c* are diagrams illustrating the rolling motion of the anvil.

FIG. 11*a* to 11*c* illustrate the rolling action of the anvil 138.

FIG. 11*a* shows the anvil in its start position with the guide pin 146*a* at one extreme end of an upper curved portion of the track 144. The guide pin 146*b* is at the other end of the upper curved portion of the track 144. FIG. 11*b* shows an intermediate position of the anvil 138 in which the guide pin 146*a* and the guide pin 146*b* are located respectively in the upper and lower portions of the track 144. FIG. 11*c* shows the end position with the pin 46*a* at one end of the lower curved portion of the track and the pin 146*b* at the lower end of that curved portion.

The guide track 144 on each guide member is designed to ensure an accurate repeatable rolling motion of the arcuate anvil surface against the support surface of the blade holder adjacent the cutting blade. For the described embodiment this is done by breaking down the rolling motion into a number of different parts, for example into twelve parts. Thus, the rolled position of the anvil is determined for twelve different locations and the desired location of the guide pins on the anvil is determined for those locations. Thus, the guide track can be designed.

It will readily be appreciated that in the described embodiment the rolling anvil 138 is used to perform a tab cut in association with a blade 120 which performs a full cut through all the layers of the multilayer tape. It will be readily apparent that the rolling anvil could be used by itself to perform a tab cut without association with a main cutting blade. Thus, there may be circumstances where there is no need to have a main cutting blade, or the main cutting blade could be designed independently of the rolling anvil for performing the tab cut. In that case, no cutter body actuation pin would be required. In the case where a return spring is used however it would still be necessary to provide some way of securing the return spring to the rolling anvil.

To avoid wear on the arcuate anvil surface of the rolling anvil, a groove could be made in the anvil to accommodate the blade during cutting.

It is also possible to provide a mechanism where a tab cut blade and a cut through blade are mounted on a common support to cut against a rolling anvil. The cut through blade could in that context cut against a groove on the rolling anvil.

It will be appreciated that any shape or guide track is possible provided that the necessary rolling action of the anvil is secured. In cases where there is good friction between the tape and the anvil, it may not be necessary to provide so much positive guidance within the guiding track and a simpler guiding mechanism could be used in those circumstances.

The lever can be positioned in any suitable location with respect to the slot.

In FIGS. 6 to 11*a*, the lever is shown as projecting from the main surface of the tape printer in its rest position. It is also possible for the lever to protrude from the upper surface as in the previous figures when in its rest position. This involves changing the relative position of the lever with respect to the anvil.

It should be appreciated that any other suitable cutting mechanism may be provided for use with the lever.

The provision of the keyboard in the lid part results in a tape printer which can be stored and/or transported in a compact form. For example, the printer can be kept on a desktop and when not in use, the lid can be closed providing a compact product. The lid portion means that the tape printer can not be switched on accidently. The display also is protected. The inner lid which controls the force with which the printhead cooperates with the platen as well as covering the cassette bay and the battery bay is protected from accidental damage. If the printhead and platen do not cooperate with the required amount of force, the quality of printing may be effected.

The tape printer, as can be seen from the Figures has a small desktop footprint when in the closed position. In other words, the tape printer is supported on one of its smaller surfaces. This is the side which is adjacent the hinge 10. When in use, additional stability is provided by the lid portion being in its open position. The main surface of the tape printer is thus vertical, at least during use. This main-surface has the display, the cassette receiving bay and the battery bay. The fact that the display is in a vertical orientation can make it easier for the user to view the display. By using the configuration shown in the Figures, it can be seen that the tape printer has a large desktop footprint during use. The keyboard may be relatively large which makes it easier to be operated by the user without increasing the size of the tape printer when in the closed configuration.

What is claimed is:

1. A tape printer comprising:

a tape receiving portion for receiving a supply of tape on which an image is to be printed;

a printer for printing an image on said tape;

a cutter assembly for cutting at least partially said tape; and an outer case defining a main body and substantially enclosing the tape receiving portion, the printer, and the cutter assembly, said case comprising a plurality of surfaces including at least one support surface adapted to support the tape printer on a flat surface during a printing and a tape cutting operation;

wherein the cutter assembly comprises:

a first cutting member; and a second cutting member, said second cutting member being movable toward the first cutting member and including a lever extending outward from the case, said lever being positioned and adapted to be manually movable between a cutting position and a non-cutting position, and said first and second cutting members are positioned and adapted to at least partially cut the tape when the lever is moved into the cutting position, wherein the user's movement of the lever from the non-cutting position to the cutting position provides the force to cut the tape; and wherein the case comprises a protruding portion positioned in an opposing relation to the lever, such that in use a user contacts both the lever and the protruding portion and moves the lever toward the protruding portion to move the lever into the cutting position.

2. The tape printer of claim 1, said tape printer further comprising an keyboard hingedly connected to the main body, said keyboard having an open position and a closed position, wherein said keyboard is against the main body in the closed position.

3. The tape printer of claim 2, further comprising a tape receiving door covering said tape receiving portion, wherein when said keyboard is in said closed position the door is between said keyboard and said main body.

4. The tape printer of claim 2, further comprising a tape receiving door covering said tape receiving portion, wherein said door comprises a window over at least part of the tape receiving portion whereby at least one characteristic relating to the tape contained in the tape receiving bay can be obtained by the user.

5. The tape printer of claim 1, wherein the lever and the protruding portion are sized and positioned such that in use a user contacts both of said portions simultaneously to move the lever towards the protruding portion, and wherein movement of the lever results in proportional movement of the second cutting member toward the first cutting member.

6. A tape printer as claimed in claim 1, wherein the lever and the protruding portion are sized and positioned being such that in use a user contacts both of said portions simultaneously with the thumb and with a finger of one hand, and thereby causes the lever to move from the non-cutting position to the cutting position by urging the contacting thumb and finger toward one another.

7. The tape printer of claim 1 wherein the first cutting member is stationary, and wherein the second cutting member further comprises a rolling anvil having an arcuate edge adapted to rotatingly contact the tape and urge the tape against the first cutting member, thereby at least partially cutting said tape, wherein the rolling anvil is mechanically linked to the lever.

8. The tape printer of claim 7, wherein the first cutting member further comprises a guiding pin, and wherein the tape printer further comprises a guide adapted to interact with the guiding pin to guide the movement of the rolling anvil during movement from the non-cutting position to the cutting position.

9. The tape printer of claim 1, wherein said first cutting member and second cutting member each have a contact surface adapted to cooperatingly cut tape, wherein the contact surfaces are substantially shaped to fit together when in a cutting position.

10. The tape printer of claim 9, wherein one of said surfaces is convex and the other of said surfaces is concave.

11. The tape printer of claim 1, further comprising a display.

12. The tape printer of claim 1, wherein said case comprises a main surface comprising the display, said main surface being perpendicular to the support surface on which said tape printer is supported in use.

13. The tape printer of claim 12, wherein the support surface is smaller in area than the main surface, said tape printer further comprising an keyboard hingedly connected to the main body, said keyboard having an open position and a closed position, wherein said keyboard is against the main body in the closed position and said keyboard comprises a portion adapted to contact the support surface on which said tape printer is supported during a printing and a tape cutting operation, thereby providing added stability to the tape printer.

14. The tape printer of claim 1, wherein the cutter assembly is adapted to tab cut the tape, and further comprising a full cut assembly comprising third and fourth movable portions, wherein said full cut assembly is mechanically linked to the cutter assembly such that movement of the first and second cutting members into the cutting position moves the third and fourth movable portions toward one another, thereby full cutting the tape between the third and fourth portions.

15. The tape printer of claim 14 wherein the lever is continuously movable from the non-cutting position to the cutting position, and also to a full cut position, wherein during cutting the user movement of the lever to the full cut position provides the force needed to full cut the tape.

16. The tape printer of claim 1, wherein the cutter assembly is adapted to full cut the tape, and further comprising a tab cut assembly comprising third and fourth movable portions, wherein said tab cut assembly is mechanically linked to the cutter assembly such that movement of the first and second cutting members into the cutting position moves the third and fourth movable portions toward one another, thereby tab cutting the tape between the third and fourth portions.

17. The tape printer of claim 16 wherein the lever is continuously movable from the non-cutting position to the cutting position, and also to a tab cut position disposed between the non-cutting position and the cutting position, wherein the user movement of the lever to the tab cut position provides the force needed to tab cut the tape.

18. A tape printer comprising:

a tape receiving portion for receiving a supply of tape on which an image is to be printed;

a printer for printing an image on said tape;

means for cutting at least partially said tape; and a case defining a main body and substantially enclosing the tape receiving portion, the printer, and the cutter assembly;

wherein the means for cutting comprises:

a first cutting member; and a second cutting member comprising a cutting portion mechanically connected to a lever, wherein the cutting portion is movable toward the first cutting member, and the lever extends outward from the case, said lever being movable by the user between a cutting position and a non-cutting position, wherein movement of the lever by the user from the non-cutting position to the cutting position moves the cutting portion toward the first cutting member and provides the force needed to cut the tape; and wherein the case comprises an opposing protruding portion positioned in an opposing relation to the lever, such that in use a user contacts both the lever and the protruding portion simultaneously with a finger and thumb of one hand and moves the lever toward the opposing portion to move the lever from the non-cutting position into the cutting position.

19. The tape printer of claim 18, further comprising an exit for said printed and cut tape, said exit being defined in a recess in said housing.

20. The tape printer of claim 18, wherein said case comprises a plurality of surfaces including at least one support surface adapted to support the tape printer on a flat surface during a printing and a tape cutting operation and a main surface comprising a display, said main surface being perpendicular to at least one support surface on which said tape printer can be supported in use, wherein the support surface is smaller in area than the main surface; said tape printer; the tape printer further comprising an keyboard hingedly connected to the main body, said keyboard having an open position and a closed position, wherein said keyboard is against the main body in the closed position and said keyboard comprises a portion adapted to contact the support surface on which said tape printer is supported during a printing and a tape cutting operation, thereby providing added stability to the tape printer.

21. The tape printer of claim 20, wherein the lever and the opposing portion are both disposed on a lever surface, wherein the lever surface is different from the support surface and the main surface, and wherein movement of the lever from the non-cutting position to the cutting position is substantially parallel to the lever surface.

22. A tape printer in combination with a supply of tape, said tape printer comprising:

a tape receiving bay;

printing means for printing an image on said tape;

means for cutting at least partially said tape;

a cutter operation arrangement for manually operating said means for cutting, said cutter operation arrangement comprising a first operating portion and a second operating portion, at least the first operating portion having a lever adapted to be moved by a user and thereby being movable by a user toward the second operating portion, wherein the user urging the operating portions together provides the force to cut the tape; and a case defining a main body and substantially enclosing the tape receiving portion, the printer, and the cutter assembly, wherein the lever extends out from the case to be accessible to the user, and wherein an opposing portion which is mechanically connected to the second operating portion are positioned and sized such that in use the user contacts the lever and the opposing portion with one hand in order to move the at least one movable portion towards the other.

* * * * *